United States Patent Office 3,040,625
Patented June 26, 1962

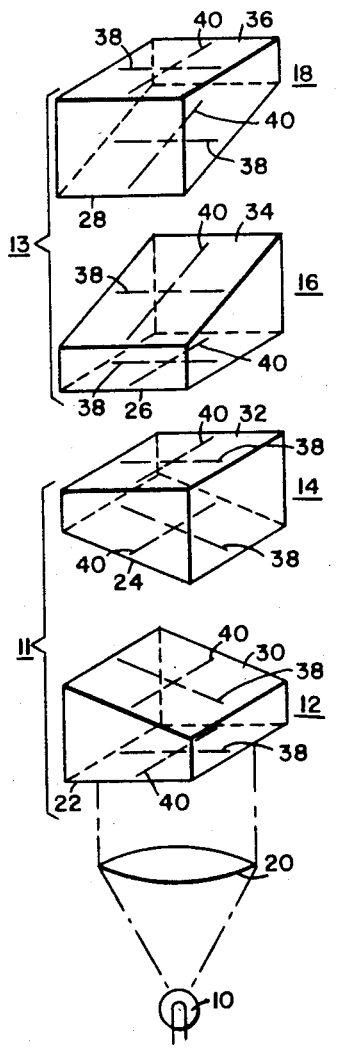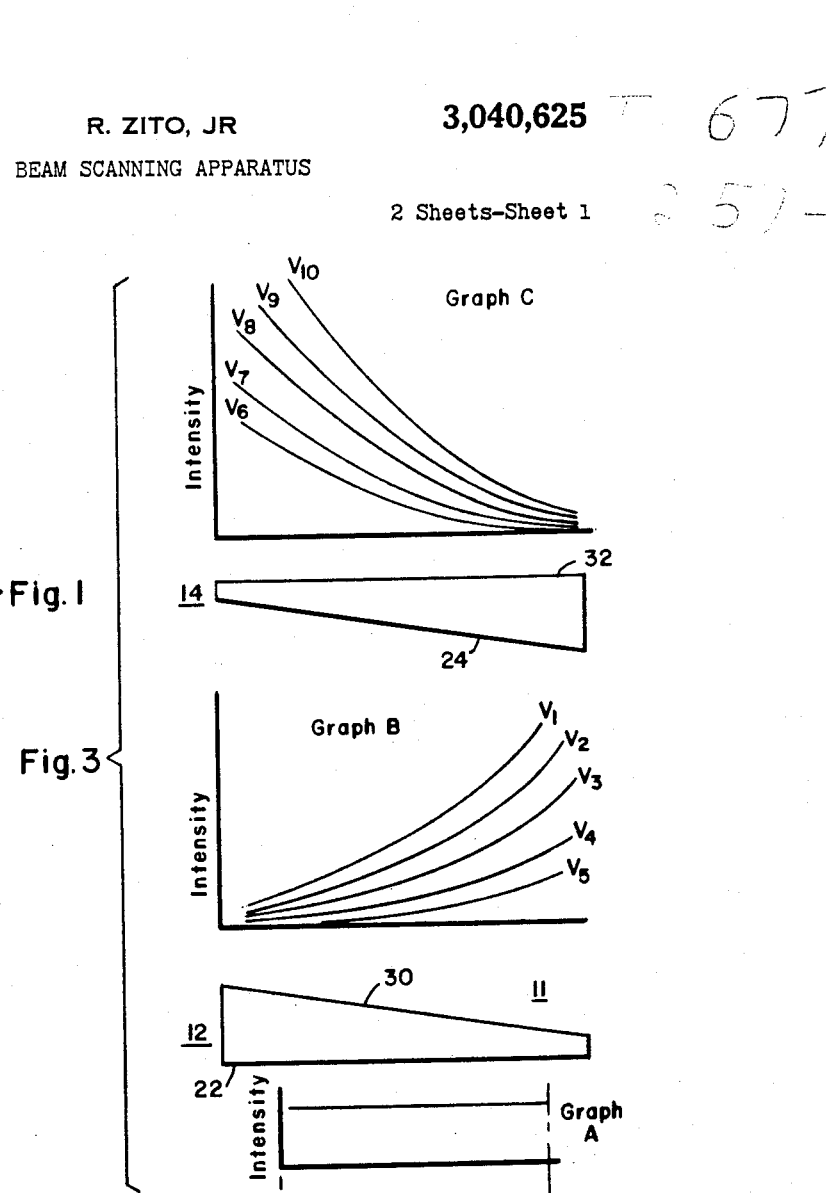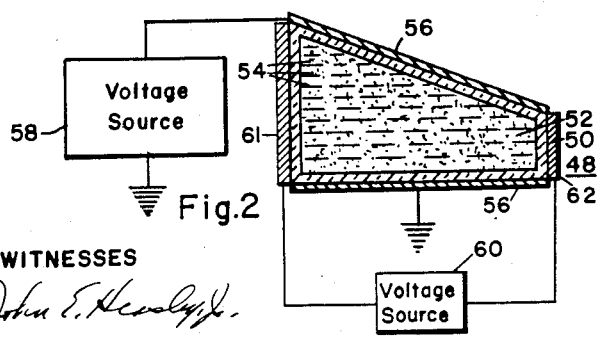

3,040,625
BEAM SCANNING APPARATUS
Ralph Zito, Jr., Wilkinsburg, Pa., assignor to Westinghouse Electric Corporation, East Pittsburgh, Pa., a corporation of Pennsylvania
Filed Sept. 12, 1958, Ser. No. 760,745
14 Claims. (Cl. 88—61)

This invention relates to a scanning device, and, more particularly, to a light beam scanning device which will scan a beam of light over any predetermined pattern.

At present when it is necessary to physically move a beam of light, i.e., alter the direction of propagation of a light source, mechanical motion of some type is used. The most common type of optical scan is the rotating or oscillating mirror projection system. The mirror is usually mounted on a rotating shaft and powered by an electric motor, or mounted directly onto an electromechanical vibrator. High speed systems also have been developed which utilize the micro-motion that may be obtained by ultrasonic excitation of magnetostrictive devices. All of the systems of the prior art require a large amount of mechanical motion to accomplish the scanning of a predetermined pattern.

It is therefore an object of this invention to provide an improved beam scanning apparatus having a minimum of mechanical motion.

A further object of this invention is to provide an improved beam scanning apparatus that utilizes the effect of a voltage gradient on a cell containing a dielectric fluid in which particles are suspended.

An additional object of this invention is to provide an improved beam scanning apparatus which operates on the principle of small particle alignment by means of an electric field.

A supplementary object of this invention is to provide an improved beam scanning apparatus utilizing cells having a variable transmissivity over a given dimension.

Still another object of this invention is to provide an improved beam scanning apparatus utilizing cells whose transmissivity is a function of applied voltage.

An auxiliary object of this invention is to provide an improved beam scanning apparatus utilizing a plurality of Kerr electrooptical cells.

These and other objects of this invention will be apparent from the following description, taken in accordance with the accompanying drawing, throughout which like reference characters indicate like parts, which drawing forms a part of this application and in which:

FIGURE 1 is a perspective view of one form of this invention;

FIG. 2 is a cross-sectional view of a representative cell showing the structure in accordance with an embodiment of this invention;

FIG. 3 is a schematic explanatory view of two cells with curves representative of the intensity of radiation transmitted by each cell;

Figure 4:
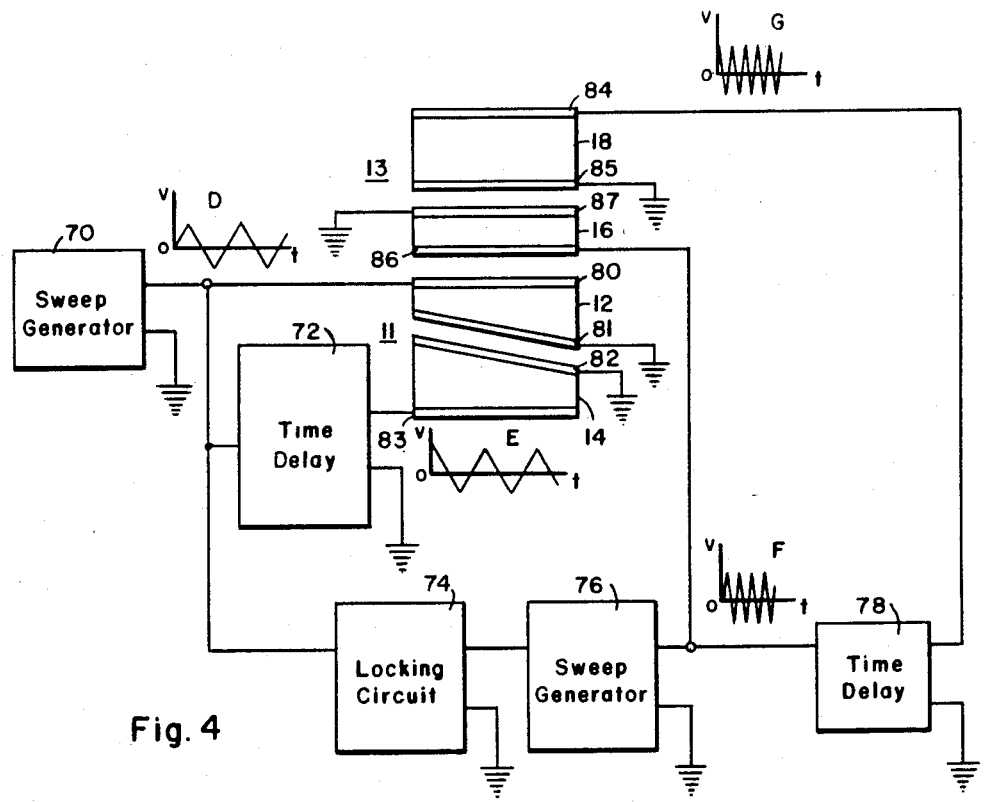
FIG. 4 is a schematic view of cell members shown in FIG. 1, together with associated circuitry.

Referring more particularly to FIG. 1, a source 10 of electromagnetic radiation, a first electrooptical unit 11 comprising cell members 12 and 14, and a second electrooptical unit 13 comprising cell members 16 and 18 are positioned so that radiation from the source 10 passes consecutively through electrooptical units 11 and 13 and therefore consecutively through each of the cell members 12, 14, 16 and 18. A collimating lens 20 may be positioned between the radiation source 10 and the first cell member 12 so that all of the rays from the radiation source 10 impinge on the first cell 12 substantially normal to the front surface 22 of the cell 12. Each cell member 12, 14, 16 and 18 includes a front surface 22, 24, 26 and 28 and a back surface 30, 32, 34 and 36 respectively, through which the radiation is transmitted. Each of the front surfaces and back surfaces have a first axis 38 and a second axis 40, the first axis 38 being perpendicular to its corresponding second axis 40. In the two cells of each electrooptical unit 11 and 13, all of the first axes 38 lie in a single plane and all of the second axes 40 lie in a single plane. The thickness of the first cell member 12 and second cell member 14 varies along their first axes 38 and the thickness of the third cell member 16 and fourth cell member 18 varies along their second axes 40. Although the embodiment shown in FIG. 1 shows a planar back surface 30, of the first cell member 12 and a planar front surface 24, of the second cell member 14, which are parallel to each other, it may be desirable in some instances for these surfaces to be curved. The same is true for the back surface 34 of the third cell member 16 and the front surface 28 of the fourth cell member 18. It should also be understood that by referring to a first and second axis of each surface that the axis of a curved surface would be the same as that of a plane and the first and second axes of each surface would be perpendicular at the crossing of the axes.

FIG. 2 shows in detail the structure of one of the cell members shown in FIG. 1. The cell member 48 includes an envelope 50 which may be of glass or other suitable material which is transmissive to the radiation emitted by source 10. The envelope 50 contains a suitable dielectric fluid 52 such as trichloroethylene, glycerine or mineral oil. The dielectric fluid 52 may also be a liquid halogenated hydrocarbon and may consist of a mixture of chlorinated diphenyl and chlorinated benzene in which the chlorinated diphenyl content may vary widely, for example from 1 to 99 percent. Such a composition may consist of a mixture of trichlorobenzene and hexachlorodiphenyl or pentachlorodiphenyl. Compositions of this character are described in United States Patent 1,931,455, entitled "Dielectric Materials for Electrical Devices" by Frank M. Clark, and assigned to the same assignee as the subject application. Compositions of this type are sometimes known as askarels.

Suspended in the dielectric fluid 52 are small flake-like particles 54 (i.e., particles having a negligible thickness in comparison to their length and width) of a conductive material such as aluminum or an insulative material such as graphite, mica and glass. The only requirement necessary is that the particles 54 are flake-like in form, substantially opaque and are substantially inert with respect to the dielectric fluid 52. It is desirable that the particles 54 have their largest dimension larger than the wavelength of the radiation transmitted through cells since, if the particles 54 are smaller than the wavelengths of the radiation, interference patterns and selective scattering of various wavelengths occurs. It has been found that particles having their largest dimension between the limits of 10 and 100 microns are desirable, but this dimension may vary between 2 and 1000 microns with satisfactory results. A conducting coating 56 which is transmissive to the radiation emitted by the source 10, is applied to either the interior or the exterior of the front and back surfaces of the envelope 50. The radiation transmissive conducting coating 56 may be made of a material such as that tin oxide coating known under the trademark "Nesa" and sold by the Pittsburgh Plate Glass Company. A variable source of voltage 58, which may be either A.C. or D.C., is connected to the conductive coating 56 and is applied across the cell member 48.

The operation of the scanning device may be described with reference to FIG. 3 which shows the light source 10, the collimating lens 20 and the electrooptical unit 11.

Radiation from the source 10 passes through the collimating lens 20. The intensity of the radiation as shown by graph A is uniform over the width of the lens. When no voltage is applied across the first cell member 12, the particles 54 suspended in the dielectric fluid 52 (as in the detailed cell structure of FIG. 2) will be randomly oriented, thereby preventing substantially all of the radiation from being transmitted through the first cell member 12. The opacity of any cell when no voltage is applied is a function of the thickness of the cell and the concentration of the particles in the dielectric fluid. For example, a cell having a concentration of 0.27 mg./ml. of aluminum flake in an askarel oil, will transmit four percent of the light impinging on the cell without the application of any voltage. When a voltage is applied, the particles 54 will align themselves with their longest dimension parallel to the direction of the applied field. Since this field is applied parallel to the direction of the radiation, the particles will be aligned so that their smallest dimensions are perpendicular to the direction of the applied field, and their largest dimensions parallel to the direction of the field. Therefore, light will pass through the first cell member 12 and will have an intensity distribution as shown by one of the curves shown in graph B depending upon the applied voltage.

Graph B shows a family of curves which relates the intensity distribution of the radiation transmitted through the first cell member 12 to the voltage applied across the front surface 22 and the back surface 30 of cell member 12. The intensity of the light transmitted through cell member 12 at any given point is a function of the thickness of the cell at that given point and the voltage applied to the cell. Cell member 14 is reversed with respect to cell member 12, the latter having its thicker end adjacent to the thinner end of the former. By adjusting the voltages to cell members 12 and 14, a horizontal line of light will be transmitted through the first electrooptical unit 11. For example, if a maximum voltage of 500 volts is applied to cell member 12 which is shown on curve B as the top line $V_1$, and a minimum voltage of zero which is shown as the lowest line $V_6$ on curve C, a horizontal line of light will emerge from cell member 14 near the right hand edge. This light is then passed consecutively through cell members 16 and 18 (shown in FIG. 1, but not in FIG. 3), and a similar operation takes place, forming a vertical "line" of light which is 90° out of phase with the example shown above. Where the two lines of light intersect, a spot of light is formed. By varying the voltages to the four cell members in a predetermined manner, this spot of light may emerge from the back surface 36 of cell member 18 and will trace any desired path.

Since the only force which will bring the particles back to an opaque condition in the absence of an applied electric field is that of Brownian motion or convection currents, the operation of the device may be too slow for some desired operations. To increase the speed of scanning, the cells may be vibrated by ultrasonic or other mechanical means or also have an electric field impressed perpendicular to the radiation passing therethrough. Therefore by impressing a field perpendicular to the radiation, the particles can be positioned so that their largest surface is perpendicular to the sources of radiation, thereby preventing the transmission of light. This may be done, for example, by means of the voltage source 60 connected across conductors 61 and 62 on the cell member 48 as shown in FIG. 3. It may be desirable to either switch this second field on and off at the appropriate time, or to have a steady field applied perpendicular to the source of radiation which would be small enough so as not to affect the particles when a field parallel to the source of radiation is impressed on the cell. Then, when the field parallel to the source is deenergized, the particles will align themselves with the field perpendicular to the radiation and thereby prevent the radiation from being transmitted.

FIG. 4 shows schematically two electrooptical units 11 and 13 together with one embodiment of a circuit that will impress the desired electrical field on the electrooptical units continuously and thereby cause a light beam to scan a predetermined pattern. The schematically shown electrooptical units 11 and 13 are optically in series. Sweep generator 70 provides a voltage having a waveform such as shown on graph D, which is a plot of voltage with respect to time. The voltage having the waveform of graph D is applied between conductive coatings 80 and 81 across cell member 12. Conductive coating 81 is connected to ground. The voltage having a waveform as shown in graph D is also passed through time delay 72 which shifts the phase 90° with respect to that shown in graph D, giving a waveform as shown in graph E. The voltage from time delay 72 is applied between conductive coatings 82 and 83 across cell member 14. Conductive coating 82 is connected to ground.

Sweep generator 76 provides a voltage having a waveform as shown on graph F. The frequency of this voltage is a multiple of the frequency of the voltage shown on graph D. The voltage having the waveform shown on graph F is applied between conductive coatings 86 and 87 across cell member 16. Conductive coating 87 is connected to ground. The voltage having the waveform of graph F is also passed through time delay 78 which shifts the phase 90° with respect to that shown in graph F, giving a waveform as shown in graph G. The voltage from time delay 78 is applied between conductive coatings 84 and 85 across cell member 18. Conductive coating 85 is connected to ground. The sweep generators 70 and 76 are connected together through locking circuit 74 to synchronize the waveforms. Although the waveforms shown in the graphs D, E, F and G are shown as sawtooth waves, it should be understood that a sine wave or other suitable waveform may be used.

It can be seen as a result of the continuously applied varying voltages that the electrooptical units 11, 13 will cause a beam of light directed therethrough to scan a desired path, for example, a path similar to a raster scanned by a television kinescope.

It can be seen from the above that the only moving parts in this scanning device are the particles suspended in the dielectric fluid, and these particles are not moved by mechanical motion but are moved by an electric field. Since there are no moving mechanical parts, this apparatus is less likely to become inoperable because of mechanical failures.

Figure 5:
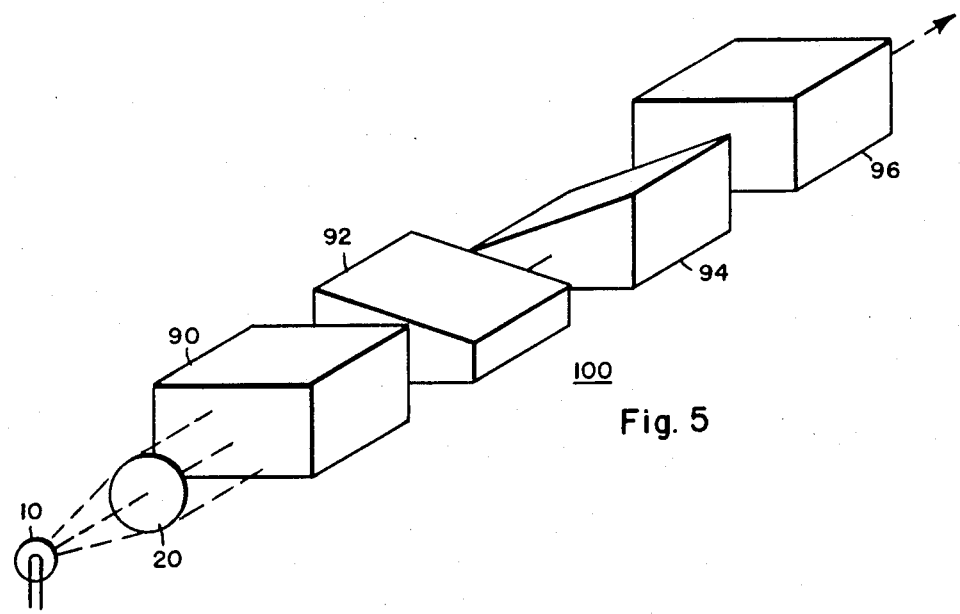
FIG. 5 is a perspective view of another embodiment of this invention.

FIG. 5 shows another embodiment of this invention in which electrooptical units utilizing the Kerr electrooptical effect are utilized in a manner similar to that described above. A source 10 of electromagnetic radiation is positioned so that the emitted radiation passes consecutively through a polarizer 90, a first Kerr electrooptical cell 92, a second Kerr electrooptical cell 94, and an analyzer 96, all of which comprise an electrooptical unit 100. If desired, a collimating lens 20 may be positioned between the radiation source 10 and the electrooptical unit 100 in a manner similar to that shown in FIG. 1. In FIG. 5, for reasons of clarity and simplicity, only one electrooptical unit 100 is shown, but in actual operation, an arrangement similar to that shown in FIG. 1 would be used. That is, an electrooptical unit similar to electrooptical unit 100 shown in FIG. 5 would be positioned so that the radiation from source 10 would pass consecutively through both electrooptical units.

A Kerr electrooptical cell is a device utilizing the Kerr electrooptical effect, that is, when certain solids, liquids or gases are subjected to an electric field they become doubly refracting. This has the result that, when linearly polarized light is passed through a Kerr cell, it emerges as elliptically polarized light. The Kerr effect is due to natural or induced anisotropy of the individual molecules of the medium and to a "lining up" of such molecules due to the electric field, which, as can be seen, is related to the lining up of the particles suspended in the cells of FIG. 2.

In operation, electromagnetic radiation, such as unpolarized light, passes through a suitable polarizer 90, such as a Nicol prism made from a calcite crystal having two portions cemented together by Canada balsam as described on page 499 of "Fundamentals of Optics" by Francis A. Jenkins and Harvey E. White, 2nd edition (1950), McGraw-Hill Book Company, New York. Other polarizers such as dichroic crystals, for example, tourmaline, are suitable. When the light leaves the polarizer 90, it will be polarized in one direction, vertically for example.

Next, the polarized light passes through the first Kerr cell 92. The Kerr cells 92, 94 may be made by filling a suitable envelope with a liquid having a high Kerr constant such as nitrobenzene. The envelope should be of a material which is transmissive of the electromagnetic radiation involved. In the particular embodiment of FIG. 5, conductive coatings, which may or may not be transmissive to the electromagnetic radiation, may be positioned on the top and the bottom of the Kerr cells 92 and 94.

As shown in FIG. 5, the first Kerr cell decreases in its vertical dimension from the left-hand side to the right-hand side of the cell and the second Kerr cell 94 decreases in its vertical dimension from the right-hand side to the left-hand side of the cell 94. As the light emerges from the first Kerr cell 92, it will be found to be elliptically polarized, that is, there will be horizontal vibration components as well as a merely vertical vibration component. The amount of this polarization will depend upon the strength of the electric field and upon the thickness of the cell, as it can be seen that the thicker part of the cell will have a weaker electric field than the thinner part of the cell and therefore radiation passing through the thicker part of the cell will not be polarized as much as that in the thinner part of the cell. When the radiation passes through the second Kerr cell 74, it will acquire additional horizontal polarization components opposite to those acquired in passing through the first Kerr cell 92. As the electromagnetic radiation passes through the analyzer 96, it will remove the vertical components of the polarization and thereby in effect will show a horizontal line which may be varied up and down depending upon the variation of the electric fields applied to the Kerr cells 92, 94. The electromagnetic radiation then passes through another electrooptical unit similar to electrooptical unit 100 shown in FIG. 5, but which is positioned to have an effect on the electromagnetic radiation at an angle with 90° in comparison with the effect of the electrooptical unit 100. Therefore, the end result will be a spot similar to that obtained in the embodiment shown in FIG. 1 which may scan a picture raster when connected to a suitable circuit such as that shown in FIG. 4.

Of course, it is also possible to have the Kerr cells (with the addition of a polarizer and an analyzer) arranged in a manner similar to that shown in FIG. 1 in which case the conductive coatings would have to be transparent as is the coating 56 in FIG. 2. In that case the electromagnetic radiation passes through the conductive coating and the dimension parallel to the axis of the electromagnetic radiation would vary as in FIG. 1 rather than varying a dimension perpendicular to the axis as in FIG. 5.

It is also possible to utilize the cells of FIGS. 1 and 2 in an arrangement such as that shown in FIG. 5, without the necessity of a polarizer or analyzer, of course. That is, the cells of FIG. 1 and FIG. 2 would vary in the dimension perpendicular to the direction of the electromagnetic radiation rather than in a dimension parallel to the direction of the electromagnetic radiation.

A particular application of a scanning apparatus as disclosed herein is in a control system for maintaining a traveling strip of material in proper registration with a mechanical member such as described in United States Patent 2,208,420, entitled "Registration Control System" by Finn H. Gulliksen issued July 16, 1940, to the same assignee as the subject application. By a substitution of the scanning apparatus of this application for the scanning means described in the above-mentioned patent, practically all mechanical motion is eliminated. This scanning apparatus may also be used in television systems that require a scanning light beam, or any other applications that require a device that produces a scanning beam of light.

While the present invention has been shown and described in certain forms only, it will be obvious to those skilled in the art that it is not so limited but is susceptible to various changes and modifications without departing from the spirit and scope thereof.

I claim as my invention:

1. A beam scanning apparatus including a source of electromagnetic radiation, a first electrooptical unit including a first cell member and a second cell member, said first unit disposed so that said radiation passes consecutively through each cell member, each cell member containing a dielectric fluid between the front and back surfaces thereof, said dielectric fluid having suspended therein a plurality of opaque flake-like particles, said cell members each having a variable thickness in the direction in which radiation passes, and a means for selectively impressing an electric field on each of said cells to align said flake-like particles so that their largest dimension is parallel to the direction of said electric field, thereby varying the intensity transmitted through each of said cells so that radiation emerging from said second cell forms a predetermined pattern.

2. A beam scanning apparatus including a source of collimated electromagnetic radiation, a first electrooptical unit including a first cell member and a second cell member, said first unit disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles, said cell members each having a variable thickness between said front and back surfaces, means for selectively impressing a first electric field on each of said cells to align said flake-like particles so that their largest dimension is parallel to the direction of said first electric field, said first electric field being parallel to said radiation emitted by said source and means for selectively impressing a second electric field on each of said cells perpendicular to said radiation emitted by said source thereby aligning said flake-like particles so that their largest dimension is perpendicular to the direction of said radiation.

3. A beam scanning apparatus including a source of collimated electromagnetic radiation, a first electrooptical unit including a first cell member and a second cell member, said first unit disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles, said particles being larger than the wavelengths of radiation emitted by said source, said cell members each having a variable thickness between said front and back surfaces, and means for selectively impressing an electric field on each of said cells to align said flake-like particles so that their largest dimension is parallel to the direction of said electric field, thereby varying the intensity transmitted through each of said cells so that radiation emerging from said second cell forms a predetermined pattern.

4. A beam scanning apparatus including a source of collimated electromagnetic radiation, a first electrooptical unit including a first cell member and a second cell member, said first unit disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles having their longest dimension between the limits of 2 and 1000 microns, said cell members each having a variable thickness between said front and back surfaces, and a means for selectively impressing an electric field on each of said cells to align said flake-like particles so that their largest dimension is parallel to the direction of said electric field, thereby varying the intensity transmitted through each of said cells so that radiation impinging from said second cell forms a predetermined pattern.

5. A beam scanning apparatus including a source of electromagnetic radiation, a first electrooptical unit including a first cell member and a second cell member, said first unit disposed so that said radiation passes consecutively through each cell member, each cell member including a front surface and a back surface through which said radiation is transmitted, each of said front and back surfaces having a first axis and a second axis, each of said first axes being perpendicular to its corresponding second axis, all of said first axes lying in a single plane and all of said second axes lying in a single plane, the thickness of the first and second cells of said first unit varying along said first axes, each cell member containing a suspension of flake-like particles responsive to an applied field to align themselves with the field force lines to control the transmission of light through said cell member, and a means for selectively impressing an electrically controlled field on each of said cells thereby varying the intensity transmitted through each of said cells so that radiation emerging from said second cell forms a predetermined pattern.

6. A beam scanning apparatus including a source of collimated electromagnetic radiation, a first electrooptical unit including a first cell member and a second cell member, said first unit disposed so that said radiation passes consecutively through each cell member, each cell member including a front surface and a back surface through which said radiation is transmitted, each of said front and back surfaces having a first axis and a second axis, each of said first axes being perpendicular to its corresponding second axis, each of said cells having all of said first axes lying in a single plane and all of said second axes lying in a single plane, the thickness of the first and second cells of said first unit varying along said first axes, said front surface of said first cell member and said back surface of said second cell member being perpendicular to said radiation emitted by said source, each cell member containing a suspension of flake-like particles responsive to an applied field to align themselves with the field force lines to control the transmission of light through said cell member, and a means for selectively impressing an electrically controlled field on each of said cells thereby varying the intensity transmitted through each of said cells so that radiation emerging from said second cell forms a predetermined pattern.

7. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each of said front and back surfaces having a first axis and a second axis, each of said first axes being perpendicular to its corresponding second axis, each of said electrooptical units having all of said first axes lying in a single plane and all of said second axes lying in a single plane, the thickness of the first and second cells of said first unit varying along said first axes and the thickness of the third and fourth cells of said second unit varying along said second axes, each cell member containing a suspension of flake-like particles responsive to an applied field to align themselves with the field force lines to control the transmission of light through said cell member, and a means for selectively impressing an electrically controlled field on each of said cells, said field being parallel to said radiation emitted by said source thereby varying the intensity transmitted through each of said cells so that radiation emerging from said fourth cell forms a predetermined pattern.

8. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each of said front and back surfaces having a first axis and a second axis, each of said first axes being perpendicular to its corresponding second axis, each of said electrooptical units having all of said first axes lying in a single plane and all of said second axes lying in a single plane, the thickness of the first and second cells of said first unit varying along said first axis and the thickness of the third and fourth cells of said second unit varying along said second axes, each cell member containing a suspension of flake-like particles responsive to an applied field to align themselves with the field force lines to control the transmission of light through said cell member, means for selectively impressing a first electrically controlled field on each of said cells, said first field providing lines of force parallel to said radiation emitted by said source and means for selectively impressing a second electrically controlled field on each of said cells, said second field providing lines of force perpendicular to said radiation emitted by said source.

9. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each cell member containing a dieelectric fluid between said front surface and said back surface, said dielectric fluid having suspended therein a plurality of opaque flake-like particles, each of said front and back surfaces having a first axis and a second axis, each of said first axes being perpendicular to its corresponding second axis, each of said electrooptical units having all of said first axes lying in a single plane and all of said second axes lying in a single plane, the thickness of the first and second cells of said first unit varying along said first axes and the thickness of the third and fourth cells of said second unit varying along said second axes, and a means for selectively impressing an electric field on each of said cells to align said flake-like particles so that their largest dimension is parallel to the direction of said electric field, thereby varying the intensity transmitted through each of said cells so that radiation emerging from said fourth cell forms a predetermined pattern.

10. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles, each of said front and back surfaces having a first axis and a second axis, each of said first axes being perpendicular to its corresponding second axis, each of said electrooptical units having all of said first axes lying in a single plane and all of said second axes lying in a single plane, the thickness of the first and second cells of said first unit varying along said first axes and the thickness of the third and fourth cells of said second unit varying along said second axes, said front surfaces of said first and third cell members and said back surfaces of said second and fourth cell members being perpendicular to said radiation emitted by said source, and a means for selectively impressing an electric field on each of said cells to align said flake-like particles so that their largest dimension is parallel to the direction of said electric field, thereby varying the intensity transmitted through each of said cells so that radiation emerging from said fourth cell forms a predetermined pattern.

11. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles, each of said front and back surfaces having a first axis and a second axis, each of said first axes being perpendicular to its corresponding second axis, each of said electrooptical units having all of said first axes lying in single plane and all of said second axes lying in a single plane, the thickness of the first and second cells of said first unit varying along said first axes and the thickness of the third and fourth cells of said second unit varying along said second axes, and a means for selectively impressing an electric field on each of said cells to align said flake-like particles so that their largest dimension is parallel to the direction of said electric field, said field being parallel to said radiation emitted by said source thereby varying the intensity transmitted through each of said cells so that radiation emerging from said fourth cell forms a predetermined pattern.

12. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles, each of said front and back surfaces having a first axis and a second axis, each of said first axes being perpendicular to its corresponding second axis, each of said electrooptical units having all of said first axes lying in a single plane and all of said second axes lying in a single plane, the thickness of the first and second cells of said first unit varying along said first axes and the thickness of the third and fourth cells of said second unit varying along said second axes, means for selectively impressing a first electric field on each of said cells to align said flake-like particles so that their largest dimension is parallel to the direction of said first electric field, said first electric field being parallel to said radiation emitted by said source and means for selectively impressing a second electric field on each of said cells perpendicular to said radiation emitted by said source thereby aligning said flake-like particles so that their largest dimension is perpendicular to the direction of said radiation.

13. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles, said particles being larger than the wavelengths of radiation emitted by said source, each of said front and back surfaces having a first axis and a second axis, each of said first axes being perpendicular to its corresponding second axis, each of said electrooptical units having all of said first axes lying in a single plane and all of said second axes lying in a single plane, the thickness of the first and second cells of said first unit varying along said first axes and the thickness of the third and fourth cells of said second unit varying along said second axes, and a means for selectively impressing an electric field on each of said cells to align said flake-like particles so that their largest dimensions is parallel to the direction of said electric field, thereby varying the intensity transmitted through each of said cells so that radiation emerging from said fourth cell forms a predetermined pattern.

14. A beam scanning apparatus including a source of collimated electromagnetic radiation, a first electrooptical unit including a first cell member and a second cell member, a second electrooptical unit including a third cell member and a fourth cell member, said first and second units disposed so that said radiation passes consecutively through each cell member, each cell member including a front surface and a back surface through which said radiation is transmitted, each cell member containing a dielectric fluid between said front surface and said back surface, said dielectric fluid having suspended therein a plurality of opaque flake-like particles, said particles having their longest dimension between the limits of 2 and 1000 microns, each of said front and back surfaces having a first axis and a second axis, each of said first axes being perpendicular to its corresponding second axis, each of said electrooptical units having all of said first axes lying in a single plane and all of said second axes lying in a single plane, the thickness of the first and second cells of said first unit varying along said first axes and the thickness of the third and fourth cells of said second unit varying along said second axes, and a means for selectively impressing an electric field on each of said cells to align said flake-like particles so that their largest dimension is parallel to the direction of said electric field, thereby varying the intensity transmitted through each of said cells so that radiation impinging from said fourth cell forms a predetermined pattern.

References Cited in the file of this patent

UNITED STATES PATENTS

| | | |
|---|---|---|
| 1,670,757 | Von Bronk | May 22, 1928 |
| 1,963,496 | Land | June 19, 1934 |
| 2,290,581 | Donal | July 21, 1942 |